United States Patent [19]
Hasegawa

[11] Patent Number: 5,643,083
[45] Date of Patent: Jul. 1, 1997

[54] CONTROL DEVICE FOR GAME OPERATION STATE DATA

[75] Inventor: Yoshihiko Hasegawa, Suita, Japan

[73] Assignee: SNK Corporation, Japan

[21] Appl. No.: 419,024

[22] Filed: Apr. 10, 1995

[30] Foreign Application Priority Data

Apr. 15, 1994 [JP] Japan .................... 6-077020

[51] Int. Cl.$^6$ .................................... A63F 9/24
[52] U.S. Cl. ............................. 463/1; 364/410
[58] Field of Search ................ 273/85 G, DIG. 28, 273/148 B, 434, 435, 143 R; 364/410; 463/1, 16, 25, 29

[56] References Cited

U.S. PATENT DOCUMENTS

| | | | |
|---|---|---|---|
| 4,342,454 | 8/1982 | Baer et al. | 273/85 G |
| 4,455,024 | 6/1984 | Yanagawa | 273/85 G |
| 5,078,399 | 1/1992 | Lennon, Jr. | 273/148 B |
| 5,203,848 | 4/1993 | Wang | 273/435 |
| 5,219,167 | 6/1993 | Hamano | 273/143 R |
| 5,251,909 | 10/1993 | Reed et al. | 273/439 |
| 5,396,225 | 3/1995 | Okada et al. | 273/85 G X |

*Primary Examiner*—Jessica Harrison
*Assistant Examiner*—Michael O'Neill
*Attorney, Agent, or Firm*—Merchant, Gould, Smith, Edell, Welter & Schmidt

[57] ABSTRACT

The object is to provide game operation data control device capable of knowing accurate operation state of game programs. Game start signal output means 5, upon receiving a throw-in signal from a throw-in sensor 3 and a game start signal from a game start selection button 4, outputs a game start enabling signal. Game program control means 7, upon receiving the signal, starts the game program. Game state detection means 9, makes access to the game program control means 7 to detect current game state data. Calculation means 11, based on time data from time measuring means 13 and the game state data, calculates game program continuation time, and further calculates average game time of the game program.

15 Claims, 23 Drawing Sheets

Fig. 11

| SLOT No. | SLOT 1 | SLOT 2 | SLOT 3 | SLOT 4 |
|---|---|---|---|---|
| GAME NAME | NAM1975 | BASEBALL STARS | MAHJONG | TOP PLAYERS GOLF |
| CONTINUE | 4 | 3 | 4 | UNLIMITED |
| DEMO SOUND | YES | YES | YES | YES |
| HOW TO PLAY | YES | YES | YES | YES |
| DIFFICULTY LEVEL | 4 | 2 | 3 | 4 |
| BONUS RATE SECOND BONUS | EVERY | EVERY | NO | EVERY |
| BONUS | 1000/20000 | 5000/10000 | — | 10000/20000 |
| HERO | 3 | 3 | 3 | 4 |

Fig. 14A

CASE/COIN

|  | COIN1 | SERVICE |
|---|---|---|
| 2/17 SAT | 2244 | 25 |
| 2/16 FRI | 4422 | 36 |
| 2/15 THU | 6633 | 47 |
| 2/14 WED | 8844 | 48 |
| 2/13 TUE | 2399 | 29 |
| 2/12 MON | 5699 | 94 |

Fig. 14B

CASE/COIN

|  | COIN1 | SERVICE |
|---|---|---|
| JAN | 42244 | 25 |
| FEB | 44422 | 36 |
| MAR | 56633 | 47 |
| APR | 68844 | 48 |
| MAY | 72399 | 129 |
| JUN | 55699 | 294 |

Fig. 14C

CASE/COIN

|  | COIN1 | SERVICE |
|---|---|---|
| JUL | 53262 | 20 |
| AUG | 50283 | 38 |
| SEP | 60699 | 35 |
| OCT | 63326 | 26 |
| NOV | 70106 | 140 |
| DEC | 56236 | 135 |

Fig.15A

CASE/PLAY

|  | PLAY | CONTINUE | AVERAGE TIME |
|---|---|---|---|
| 2/12 MON | 42 | 33 | 5'20" |
| 2/11 SUN | 74 | 55 | 6'20" |
| 2/10 SAT | 96 | 77 | 6'30" |
| 2/ 9 FRAI | 88 | 11 | 8'40" |
| 2/ 8 THU | 53 | 32 | 7'20" |
| 2/ 7 WED | 56 | 55 | 5'50" |
| 2/ 6 TUE | 88 | 11 | 4'30" |

Fig.15B

CASE/PLAY

|  | PLAY | CONTINUE | AVERAGE TIME |
|---|---|---|---|
| JAN | 42244 | 33363 | 5'20" |
| FEB | 44422 | 35543 | 6'20" |
| MAR | 56633 | 37773 | 7'20" |
| APR | 68844 | 39963 | 8'20" |
| MAY | 72399 | 33232 | 9'20" |
| JUN | 55899 | 15519 | 4'20" |

Fig.20A

|  | COIN1 | SERVICE |
|---|---|---|
| 2/17 SAT | 2244 | 25 |
| 2/16 FRI | 4422 | 36 |
| 2/15 THU | 6633 | 47 |
| 2/14 WED | 8844 | 48 |
| 2/13 TUE | 2399 | 29 |
| 2/12 MON | 5699 | 94 |
| ⋮ | ⋮ | ⋮ |

Fig.20B

|  | COIN1 | SERVICE |
|---|---|---|
| JAN | 42244 | 25 |
| FEB | 44422 | 36 |
| MAR | 56633 | 47 |
| APR | 68844 | 48 |
| MAY | 72399 | 129 |
| JUN | 55699 | 294 |
| JUL | 53262 | 20 |
| AUG | 50283 | 38 |
| SEP | 60699 | 35 |
| OCT | 63326 | 26 |
| NOV | 70106 | 140 |
| DEC | 58236 | 135 |

Fig.21A

|          | PLAY | CONTINUE | AVERAGE TIME |
|----------|------|----------|--------------|
| 2/12 MON | 42   | 33       | 5'20"        |
| 2/11 SUN | 74   | 55       | 6'20"        |
| 2/10 SAT | 96   | 77       | 6'30"        |
| 2/ 9 FRAI| 88   | 11       | 8'40"        |
| 2/ 8 THU | 53   | 32       | 7'20"        |
| 2/ 7 WED | 56   | 55       | 5'50"        |
| 2/ 6 TUE | 88   | 11       | 4'30"        |
| ⋮        | ⋮    | ⋮        | ⋮            |

Fig.21B

|     | PLAY  | CONTINUE | AVERAGE TIME |
|-----|-------|----------|--------------|
| JAN | 42244 | 33363    | 5'20"        |
| FEB | 44422 | 35543    | 6'20"        |
| MAR | 56633 | 37773    | 7'20"        |
| APR | 68844 | 39963    | 8'20"        |
| MAY | 72399 | 33232    | 9'20"        |
| JUN | 55899 | 15519    | 4'20"        |
| ⋮   | ⋮     | ⋮        | ⋮            |

5,643,083

CONTROL DEVICE FOR GAME OPERATION STATE DATA

BACKGROUND OF THE INVENTION

1. Technical Field of the Invention

This invention relates to a device for controlling game operation state data for a game machine.

2. Prior Art

Generally, a game operation state data control device for business purposes causes a game program installed in a ROM of a game machine to initiate operation when a coin is put in the machine. The number of coins put in is counted by a coin counter or the like. Frequency of uses of the game program is known from the number of coins put in.

A problem with the game operation state data control device described above is that only the number of coins can be known as game operation state data. An accurate game operation state can not be obtained.

SUMMARY OF THE INVENTION

An object of this invention is to provide a game operation state data control device and a method therefor capable of obtaining detailed game operation state data, as a solution to the problem described above.

A game operation state data control device for a game machine comprises;

- a sensor for outputting a throw-in signal when a valuable object for enabling to run a game is thrown in said game machine,
- a button for outputting a game start signal when operated by a player,
- a first generating means for generating a game start enabling signal upon receiving said throw-in signal and said game start signal,
- a control means for starting a game program upon receiving said game start signal,
- a detecting means for detecting current game state data,
- a clock means for generating time data designating current time,
- a calculating means for calculating game operation state data according to said time data and said current game state data, and
- a game operation state data storing means for storing said game operation state data not so as to decide whether said player can play said game machine but to enable to analyze running state data of said game machine.

The above, and other objects, features and advantages of the present invention will become apparent from the following description in conjunction with the accompanying drawings, in which like reference numerals designate the same elements.

BRIEF DESCRIPTION OF THE DRAWINGS

FIG. 9A shows a main picture, and FIG. 9B a software dip switch setting picture, FIG. 10A shows a design picture of a game 1, FIG. 10B a sum display picture, and FIG. 10C a calendar setting picture, FIG. 11 is an example of a table of construction data for game structure stored in a RAM 57, FIGS. 14A, 14B and 14C show "CASE/COIN" displays; FIG. 14A is a one week sum display, FIG. 14B the first half year sum display, and FIG. 14C is the second half year sum display, FIGS. 15A and 15B show "CASE/PLAY" display and "GAME 1/PLAY" display; FIG. 15A shows a one week sum display in the "CASE/PLAY" and FIG. 15B is the first half year sum display in the "CASE/PLAY."

FIGS. 20A and 20B show example data transferred to the memory card, FIGS. 21A and 21B show example data transferred to the memory card;

DETAILED DESCRIPTION OF THE INVENTION

(1) Game Operation State Data Control Device 1

Figure 1:
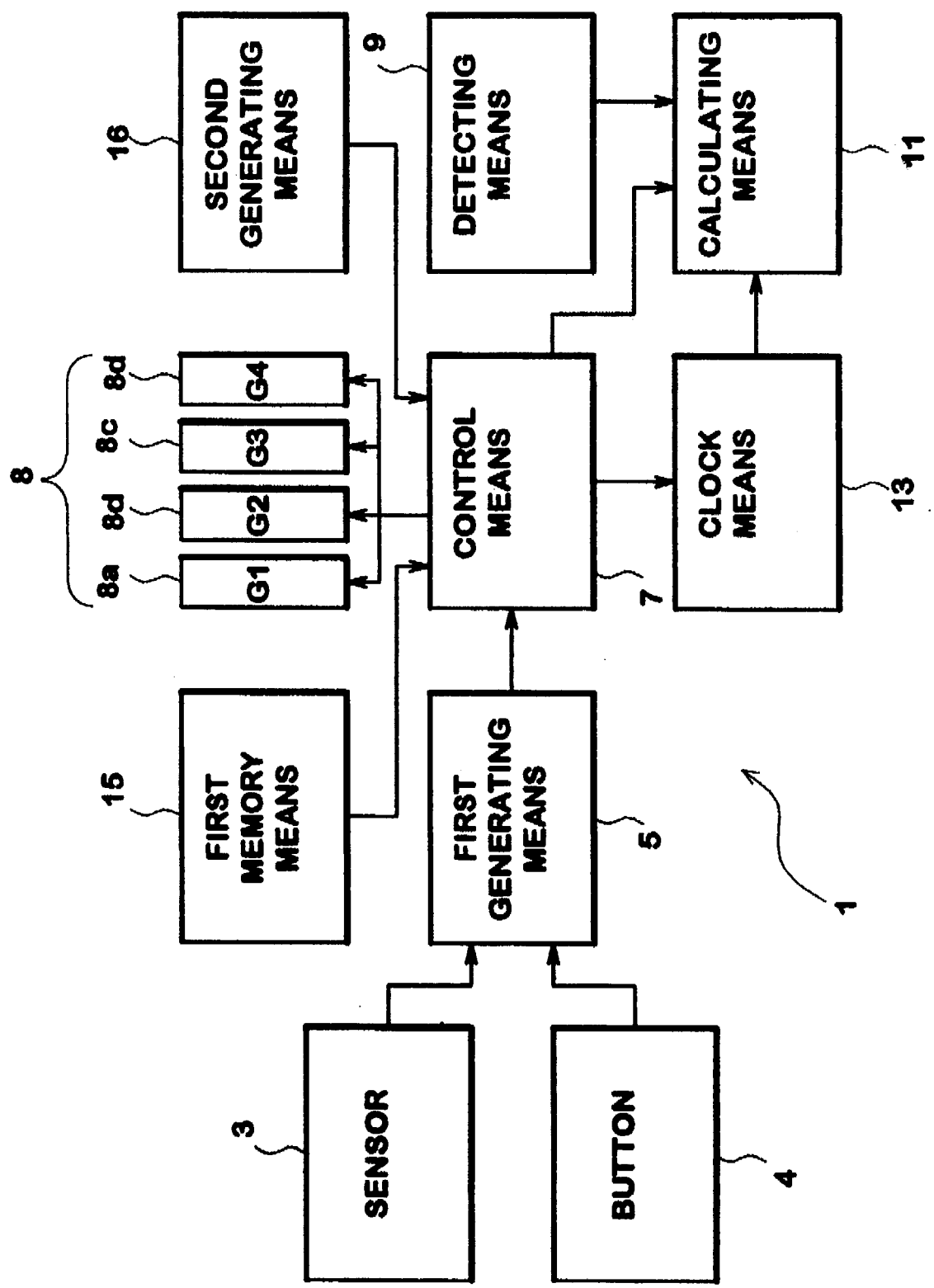
FIG. 1 is a functional block diagram of a game operation state data control device 1 according to this invention.

FIG. 1 shows a functional block diagram of a game operation state data control device 1 as an embodiment of this invention. The game operation state data control device 1 comprises; a sensor 3, a button 4, a first generating means 5, a control means 7, a detecting means 9, a clock means 13, a calculating means 11, a first memory means 15, and a second generating means 16.

The sensor 3 outputs a throw-in signal when a valuable object is put in the game machine. The valuable object includes a coin, a bill, or a game ticket. The button 4 outputs a game start signal when operated by a player. The game start signal includes a selection signal for selecting a game program from a plurality of game programs.

The first generating means 5 generates a game start enabling signal upon receiving the throw-in signal and the game start signal.

The control means 7 starts a game program upon receiving the game start signal. The control means 7 is connected to a game program 8 to be started by the game start signal. In this embodiment, the game program 8 comprises four game programs 8a through 8d. The control means 7 causes either one of the game programs 8a through 8d to be started by a selection signal outputted from the button 4.

The detecting means 9 detects current game state data. The clock means 13 generates time data designating current time.

The calculating means 11 calculates a game operation state data according to the time data and the current game state data. In this embodiment, the game operation state data used includes a continuation time of a game program, a game start time and a game end time of the game program. The game operation state data is used to calculate an average game play time of a game program.

The first memory means 15 stores a game progress degree at a temporary end time of a game program as a temporary end time progress degree. The second generating means 16 outputs a resume signal when a player starts operation.

The control means 7 starts the game program according to the temporary end time progress when the resume signal arrives, and outputs a resume start signal. The calculating means 11 calculates the number of resume starts by counting the resume start signals.

A game operation state data storing means 12 stores the game operation state data not so as to decide whether the player can play the game machine but to enable to analyze running state data of the game machine.

In this embodiment, the term coin refers to any coin that can be used for a game, including for example ordinary coins and special coins for games.

(2) Hardware Structure

Figure 2:
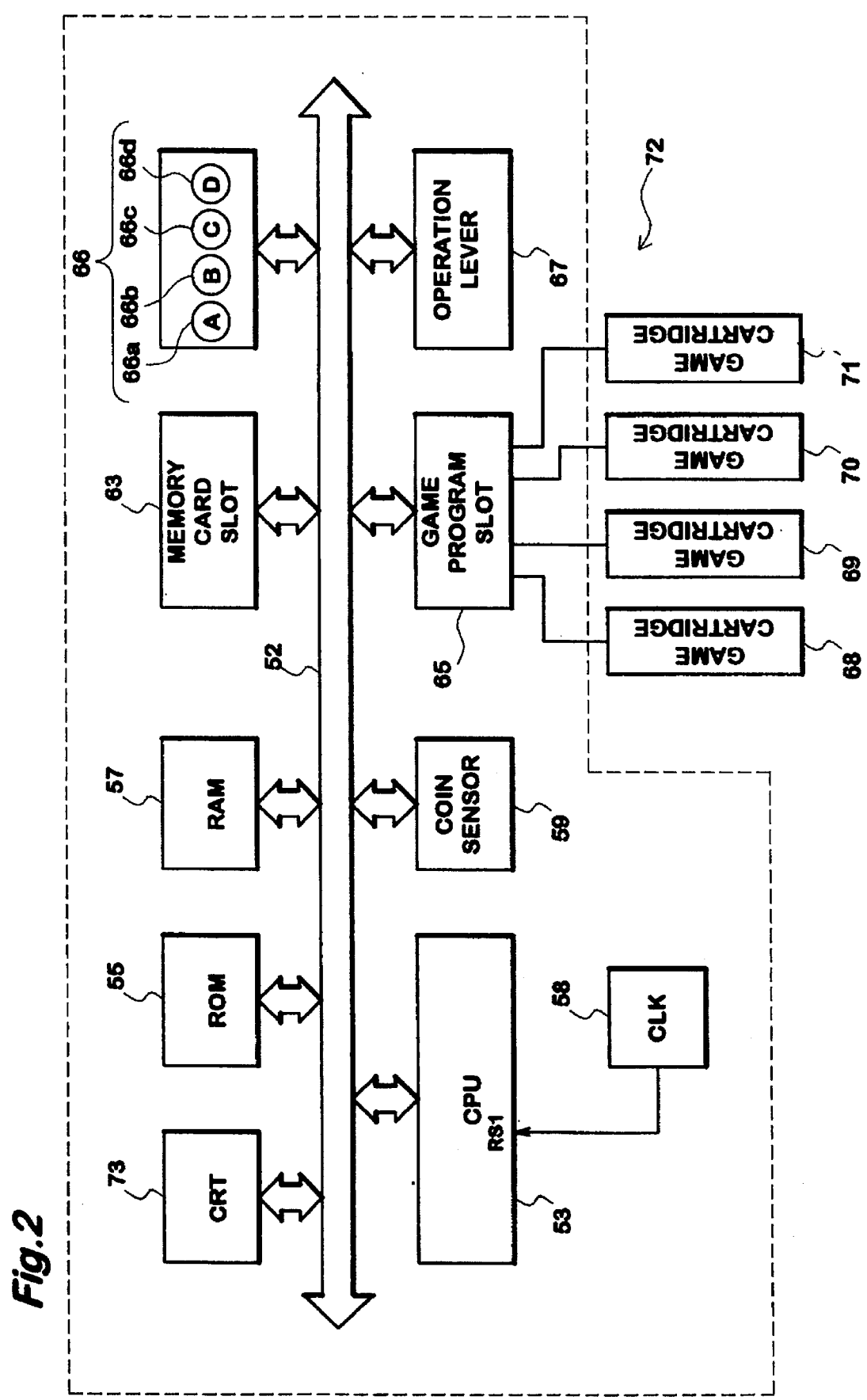
FIG. 2 is a hardware structure of a CPU embodying the game operation state data control device 1.

FIG. 2 shows an example of hardware structure for the game operation data control device 1 embodied with a CPU. The game operation state data control device 1 shown in FIG. 2 comprises; a CPU 53, a ROM 55, a RAM 57, a CRT 73, a memory card slot 63, a group of operation buttons 66, a game program slot 65, an operation lever 67, a coin counter 59, and a bus 52.

A control program is stored in the ROM 55 for the CPU 53. CPU 53 controls various parts through the bus 52 according to the control program. A clock 58 is connected to interrupt terminal RS1 of the CPU 53.

The RAM 57 stores the start time and the game continuation time of the game program to be calculated.

The RAM 57 also stores corresponding construction data for game structure (including difficulty level). The construction data is changed by software dip switch setting which will be described later. The memory card slot 63 is for receiving a memory card for storing sum results of game program operation states.

The operation buttons 66 comprise buttons A through D. The operation buttons 66 and the operation lever 67 are used by a player to select a game, select resumption, or move a hero during the game. They are also used to select sum results display.

The CRT 73 serves as game display means, and also as sum results display means.

The game program slots 65 can receive a plurality of game cartridges. In this embodiment, four game cartridges 68 through 71 are inserted. Each of the game cartridges has a ROM storing a game program.

Figure 3:
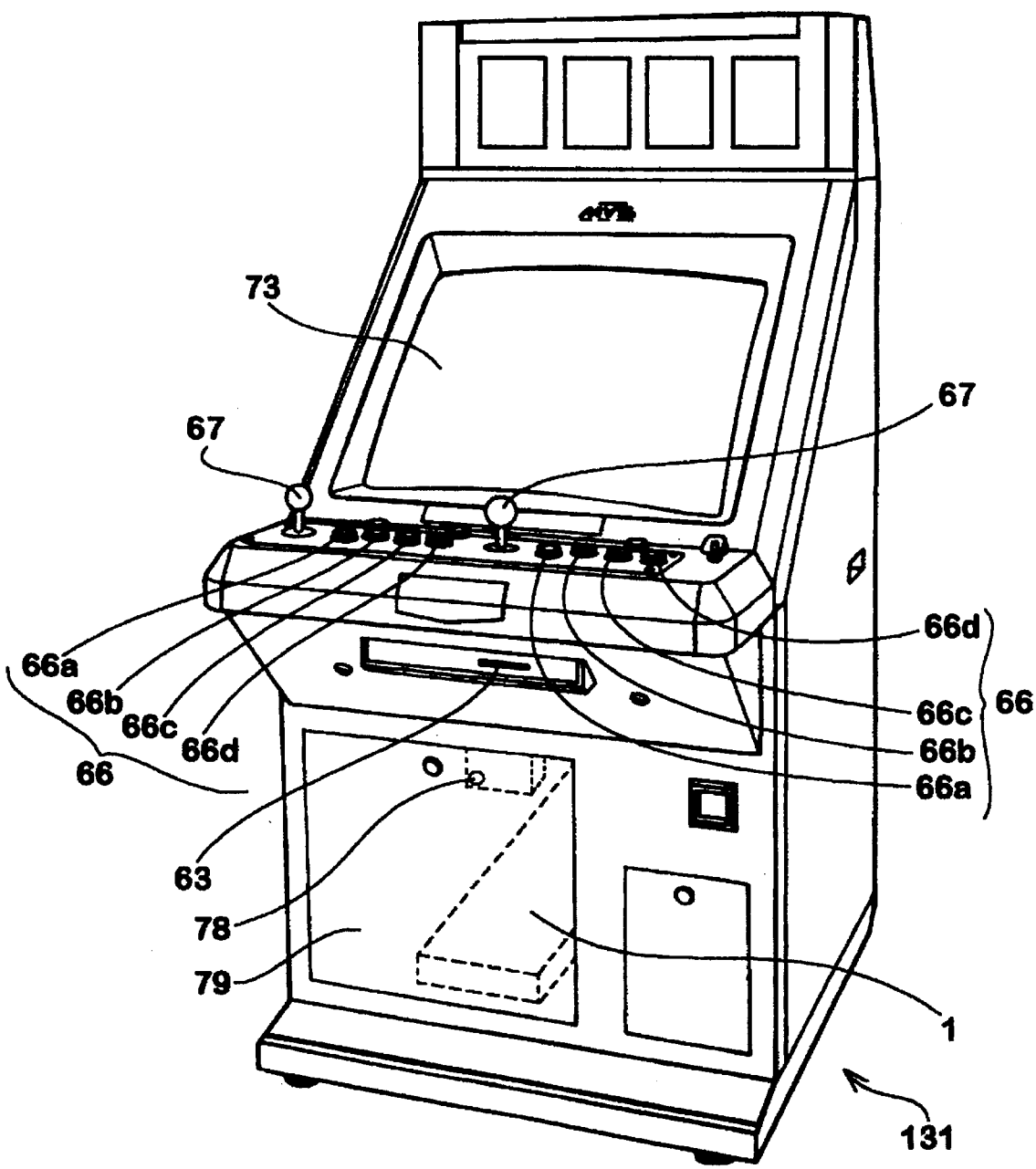
FIG. 3 is a perspective view of an arcade game machine 131.

FIG. 3 shows a perspective view of an arcade game machine 131 for which the game operation state data control device 1 is used. A pair of the operation levers 67 and a pair of the operation buttons 66 are provided in the arcade game machine 131 in order that two players can combat with each other. The game operation state data control device 1 is stored inside a cover 79. Also a test button 78 which will be described later is stored inside the cover 79.

(3) System Program Flow Chart during Game

Figure 4:
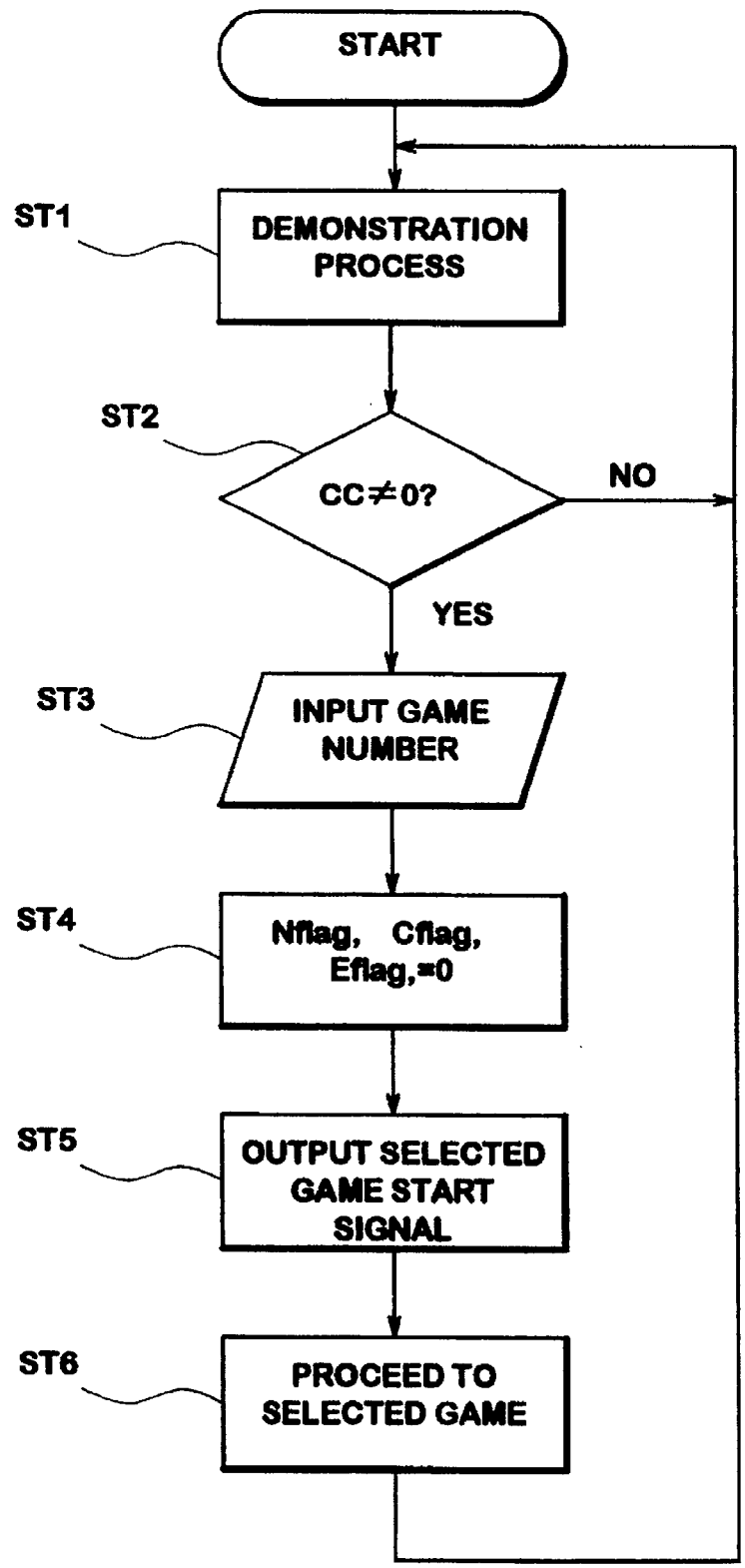
FIG. 4 is a process flow chart for a system program.

FIG. 4 shows a processing flow chart during data summing. The CPU 53 shown in FIG. 2 sequentially runs demonstration processes of the games in the game cartridges 68 through 71 inserted in the game program slots 65 (step ST1 in FIG. 4).

The CPU 53 determines whether the value of the coin counter CC is zero or not (step ST2 in FIG. 4), and if zero, returns to the step ST1 to run a demonstration process. The coin counter CC is changed by an interrupt program which will be described later. When the value of the coin counter CC is not zero in the step ST2 in FIG. 4, the CPU 53 proceeds to the step ST3. When the player inputs a selected game program number by pressing the A button 66a (step ST3 in FIG. 4), the CPU initializes Nflag, Cflag, and Eflag (step ST4 in FIG. 4). The Nflag, Cflag, and Eflag will be described later.

The CPU 53 outputs a corresponding game start signal to run the selected game program (step ST6). The CPU 53 reads a ROM of the cartridge corresponding to the game start signal and moves on to the step to run the stored game program (step ST6).

In this embodiment, the step ST5 corresponds to part of the process run by the first generating means 5, and the step ST6 corresponds to part of the process run by the control means 7.

(4) Game Program Flow Chart during Game

Figure 5:
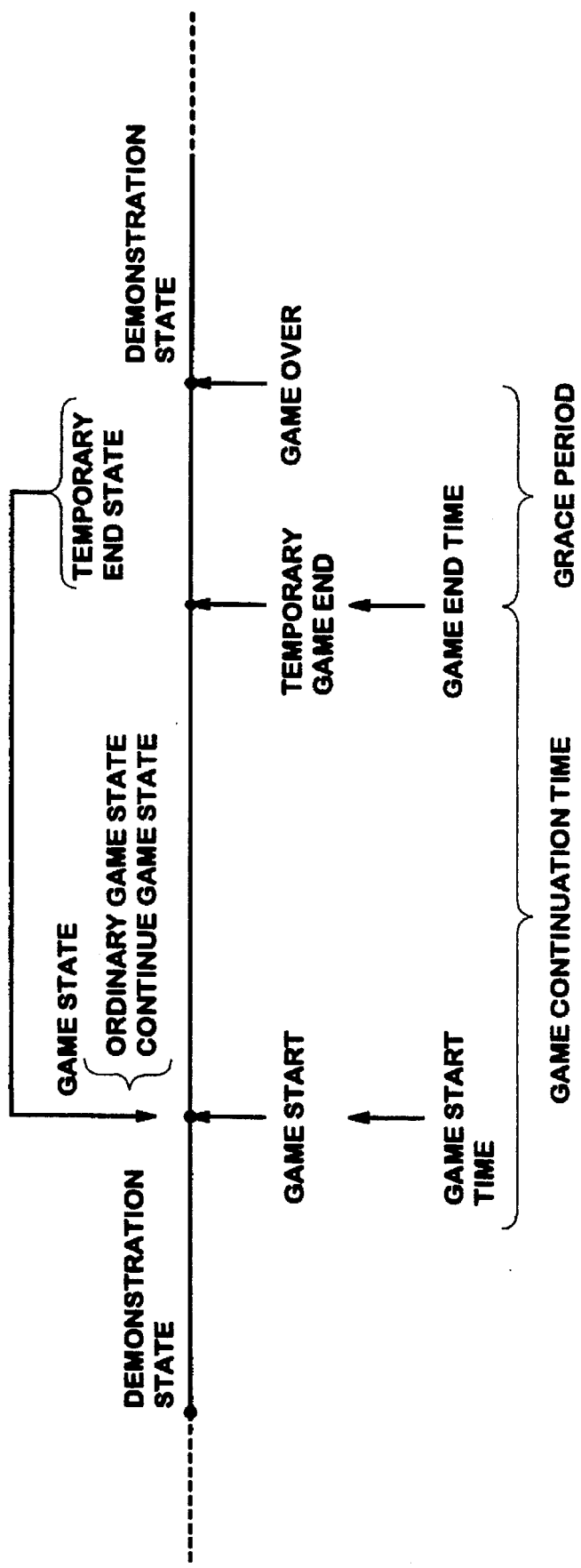
FIG. 5 is an explanatory drawing of game operating state.

Referring now to FIG. 5, state of the game program will be described. The state of the game program moves from a demonstration state to an ordinary game state when a game start signal is received. When the ordinary game state is over, the state is a temporary end state. When a predetermined period of time elapses, the demonstration picture is displayed in the CRT 73 again.

When a resume start instruction is given during the temporary end state, the state is continue-game state. In the continue-game state the game is resumed from the temporary end state. When a combat game reaches a temporary end state when the player is combatting a fourth opponent after defeating three opponents, the game can be started from the state of combatting the fourth opponent. The continue-game state can be repeated within a limited number of times.

The term "ordinary game state" refers to a state to which the game is started from the beginning. The term "continue-game state" refers to a state from which the game is resumed within a predetermined period of time after a temporary end of a game. The time when a game reaches an ordinary game state or a continue-game state is referred to as the game start time. The time when a game reaches a temporary end state after an ordinary game state or a continue-game state is referred to as the game end time. The time period of an ordinary game state or a continue-game state is referred to as the game continuation time. The time period from a game end time to a time when the game is over is referred to as a grace period.

Figure 6:
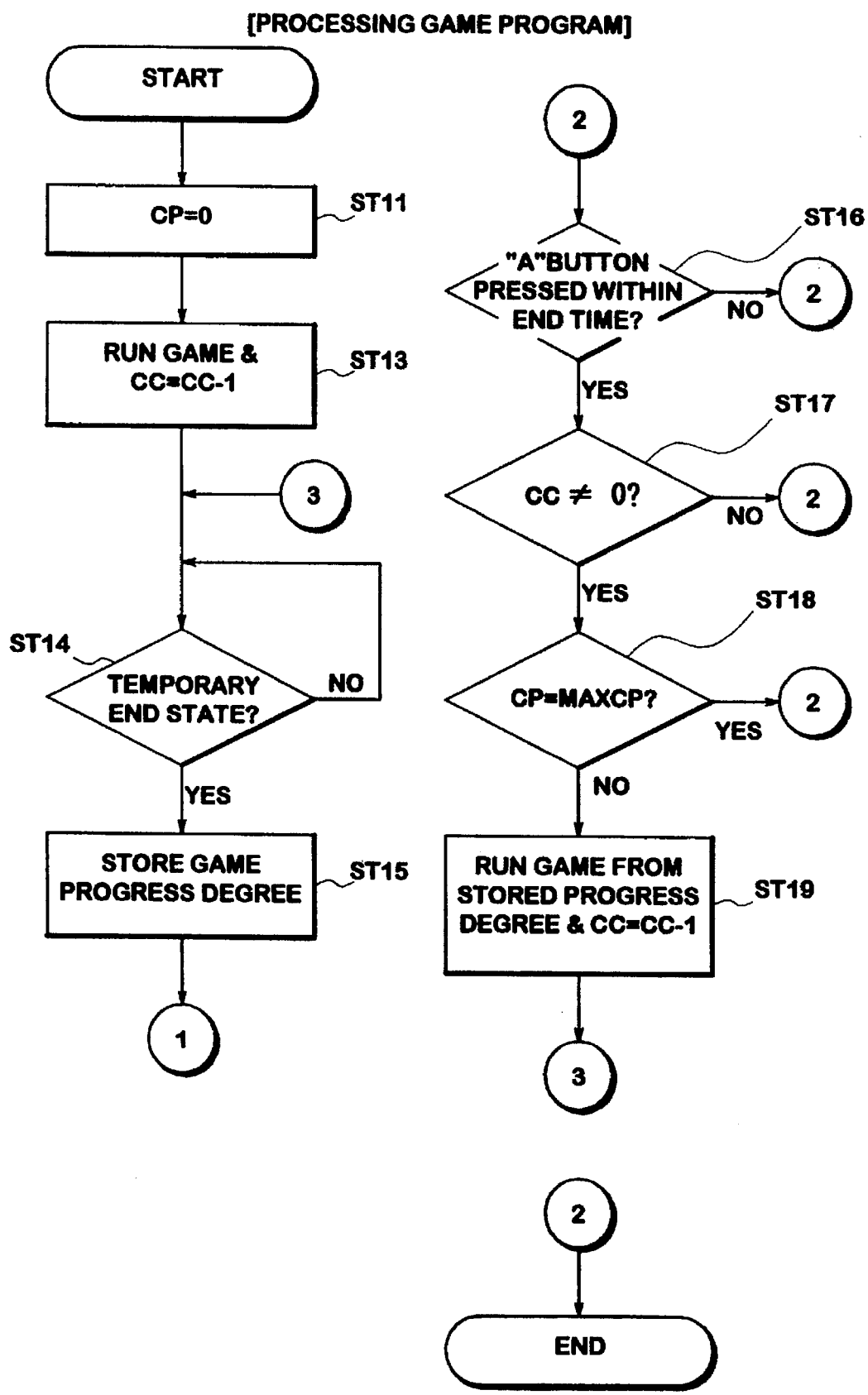
FIG. 6 is a process flow chart for a game program.

The process flow chart of the game program shown in FIG. 6 will be described. First the CPU 53 initializes the continuation counter CP (step ST11 in FIG. 6). Then it runs a selected game program and subtract "1" from the coin counter CC (step ST13). Then the CPU 53 determines in the step ST14 whether the game is in a temporary end state, and if not, proceeds to the step ST15, and stores the state as a temporary game over progress degree in the RAM 57. The determination of a temporary end state will be described later.

The CPU 53 determines whether the A button 66a (FIG. 2) is pressed within a preset grace period (step ST16 in FIG. 6), and if not, the game program process returns to the system program process, and repeats the process from the step ST1 shown in FIG. 4.

When the A button 66a is pressed within the grace period, the CPU 53 determines whether the coin counter CC is zero (step ST17), and if the coin counter CC is zero, it determines that a continued use is impossible, and performs the system program process (the process from the step ST1 in FIG. 4 on).

If the coin counter CC is not zero, the CPU 53 determines whether the continuation counter CP is equal to the maximum possible continuation number MAXCP(step ST18), and if the continuation counter CP is equal to the maximum possible continuation number MAXCP, the CPU 53 determines that a continued use is impossible, and performs the system program process (from the step ST1 shown in FIG. 4 on), because it means that the maximum possible continuation number is reached.

If the continuation counter CP is not equal to MAXCP, the CPU 53 determines that a continued use is possible, runs the game from the stored game progress degree, and subtracts 1 from the coin counter CC (step ST19), because it means that the maximum possible continuation number is not reached. Thereafter the CPU 53 repeats the process from the step ST14.

In this embodiment, since a system program is stored in a main unit 1 shown in FIG. 2, and a plurality of game cartridges are inserted in the game slots of the main unit 1, processing of the system program and the game program is repeated as described above.

In this embodiment, the steps ST13 and ST19 correspond to part of the process run by the control means 7, and the A button 66a and the RAM 57 constitute respectively the second generating means 16 and the first memory means 15.

(5) Sum Data Acquisition Flow Chart

The CPU 53 acquires sum data by an interrupt process. The term "sum data" refers to the game start time, game end time, the number of plays, and the number of resumptions. The sum data. are acquired when the game program stored in each game cartridge is being run. By the interrupt process, the sum data can be acquired without storing the summing program in the game program stored in the game cartridge. This eliminates necessity of storing the same summing program for each game program.

The interrupt process is performed at 1/60 second periods of the clock 58 shown in FIG. 2. When an interrupt signal is given to the interrupt terminal RS1 of the CPU 53, the CPU 53 determines a state of the game by a value of a game state register (not shown). Specifically, if the game state register is 0, the state is detected as demonstration, if 1 as an ordinary game state, if 2, as a game continuation state, and if 3 as a temporary end state.

The interrupt process by the CPU 53 will be described in reference to FIGS. 7 and 8. The CPU 53 determines in step ST20 whether a coin is input, and if yes, it increments the coin counter (CC=CC+1) (step ST21). If no in the step ST20, the process skips the step ST21 and proceeds to step ST22. In the step ST22, the CPU 53 determines whether the state is demonstration at the time of interrupt, and if yes, the interrupt process is over.

If not in the demonstration state on the other hand, the CPU 53 determines whether the state at the time of interrupt is an ordinary game state (Step ST23 in FIG. 7), and if yes, the process proceeds to step ST24, and determines whether a state of the Nflag is 0 or not. If a state of Nflag is zero, the CPU 53 determines that the state has changed from demonstration to an ordinary game state, proceeds to step ST25, stores the interrupt time as a game start time in the RAM 57, clears the clock counter TC (makes TC to 0), and sets the state of the Nflag to 0. In step ST26, the CPU 53 increments the clock counter increment (TC=TC+1), and this finishes the interrupt process. By setting the state of the Nflag to 1, in the case the process is in an ordinary game state at the next interrupt time, namely in the case the process is in an ordinary game state at the current interrupt time and also at the next interrupt time, it means that the state of the Nflag is not 0 in the step ST24. As a result, the CPU 53 does not perform the process of step ST25 and proceeds to step ST26.

Figure 8:
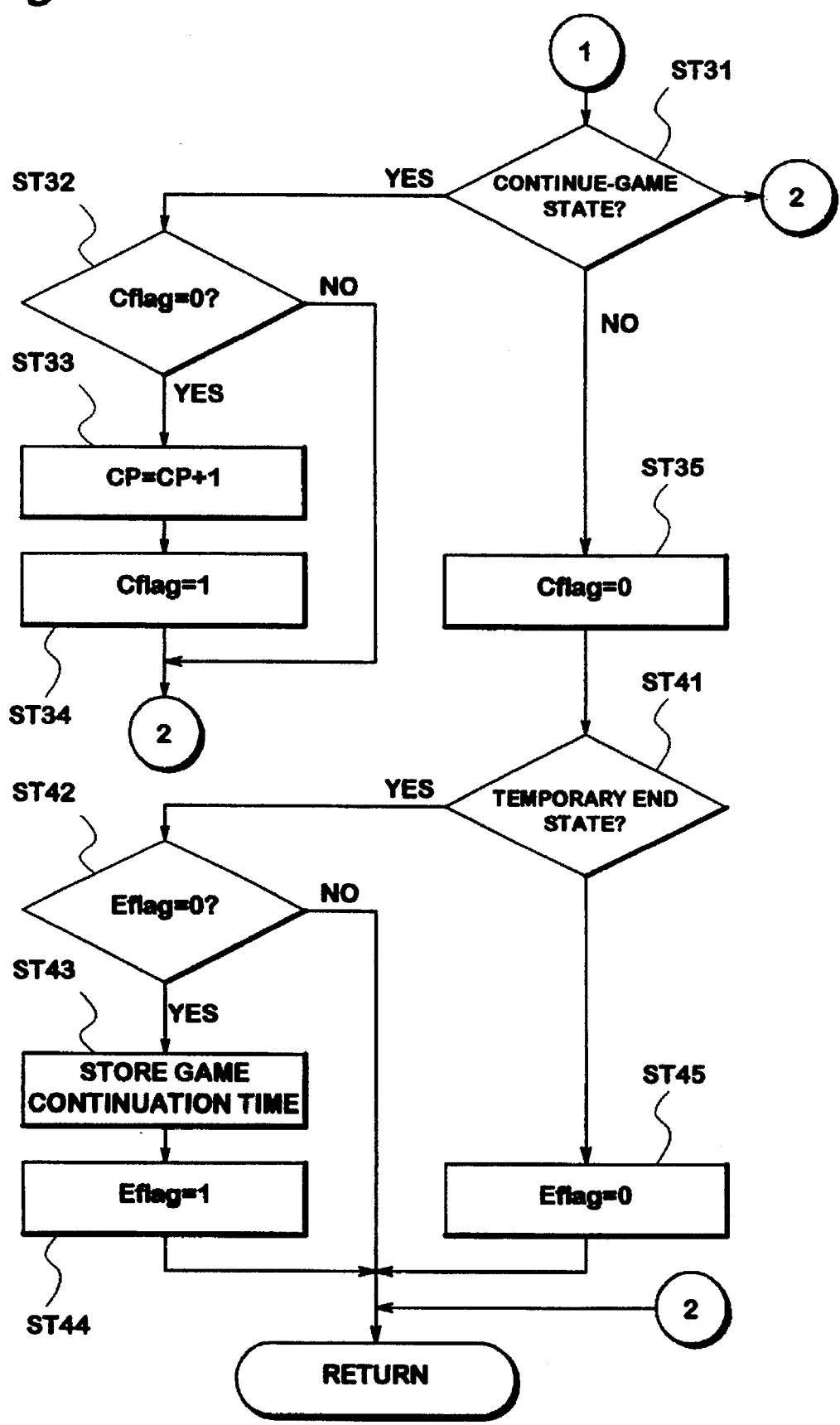
FIG. 8 is an interrupt process flow chart for knowing a game operation state.

If the process is not in an ordinary game state in the step ST23, the CPU 53 sets the state of the Nflag to 0 (step ST27), and proceeds to step ST31 shown in FIG. 8.

The CPU 35 determines whether the process is at a continue-game state at the time of interrupt, and if yes, determines whether a state of the Cflag is 0 or not (step ST32), and if yes, the CPU 53 determines that the process has changed from an ordinary game state to a continue-game state, and increments the continuation counter CP (CP=CP+1) (step ST33).

Next the CPU 53 sets the state of the Cflag to 1 to end the interrupt process (step ST34). If the process is in a continue-game state at the next interrupt time, namely if the process is in a continue-game state at the current interrupt time and also at the next interrupt time, the state of the Cflag is not 0 in step ST32. As a result, the CPU 53 finishes the interrupt process without performing the process of steps ST33 and ST34.

If the process is not in a continue-game state in the step ST31, the CPU 53 sets the state of the Cflag to 0 (step ST35) and determines whether the process is in a temporary end state (step ST41), and if yes, the CPU 53 determines whether a state of the Eflag is 0 (step ST42), and if yes, the CPU 53 determines that the process has changed from a game state (ordinary game state or continue-game state) to a temporary end state. The CPU 53 stores the game continuation time based on the clock counter TC at the time of interrupt in the RAM 57 (step ST43).

The CPU 53 sets the state of the Eflag to 1 (step ST44) to finish the interrupt process. In the case the process is in a temporary end state at the next interrupt time, namely in the case the process is in a temporary end state at the current interrupt time and also at the next interrupt time, it means that the state of the Eflag is 0 in the step ST42. As a result, the CPU 53 finishes the interrupt process without performing the process of steps ST43 and ST44.

If the process is not in a temporary end state in the step ST41, the CPU 35 finishes the interrupt process by setting the state of the Eflag to 0 (step ST45).

In this way, the game start time, game continuation time, the number of resumptions, and the number of plays are obtained by the interrupt process. The number of coins detected by the coin sensor 59 is also stored in the RAM 57.

The CPU 53 sequentially sums the game continuation times stored in the RAM 57 and divides the result with the number of plays to obtain an average time. The CPU 53 calculates an average time whenever a play is over and stores the result in the RAM 57. When the plays of a day are over, the data are stored as the game operation state data of that day. In this way, the game operation state data for that day are stored in the RAM 57. When data for a month are accumulated, they are stored as game operation state data for that month.

Figure 7:
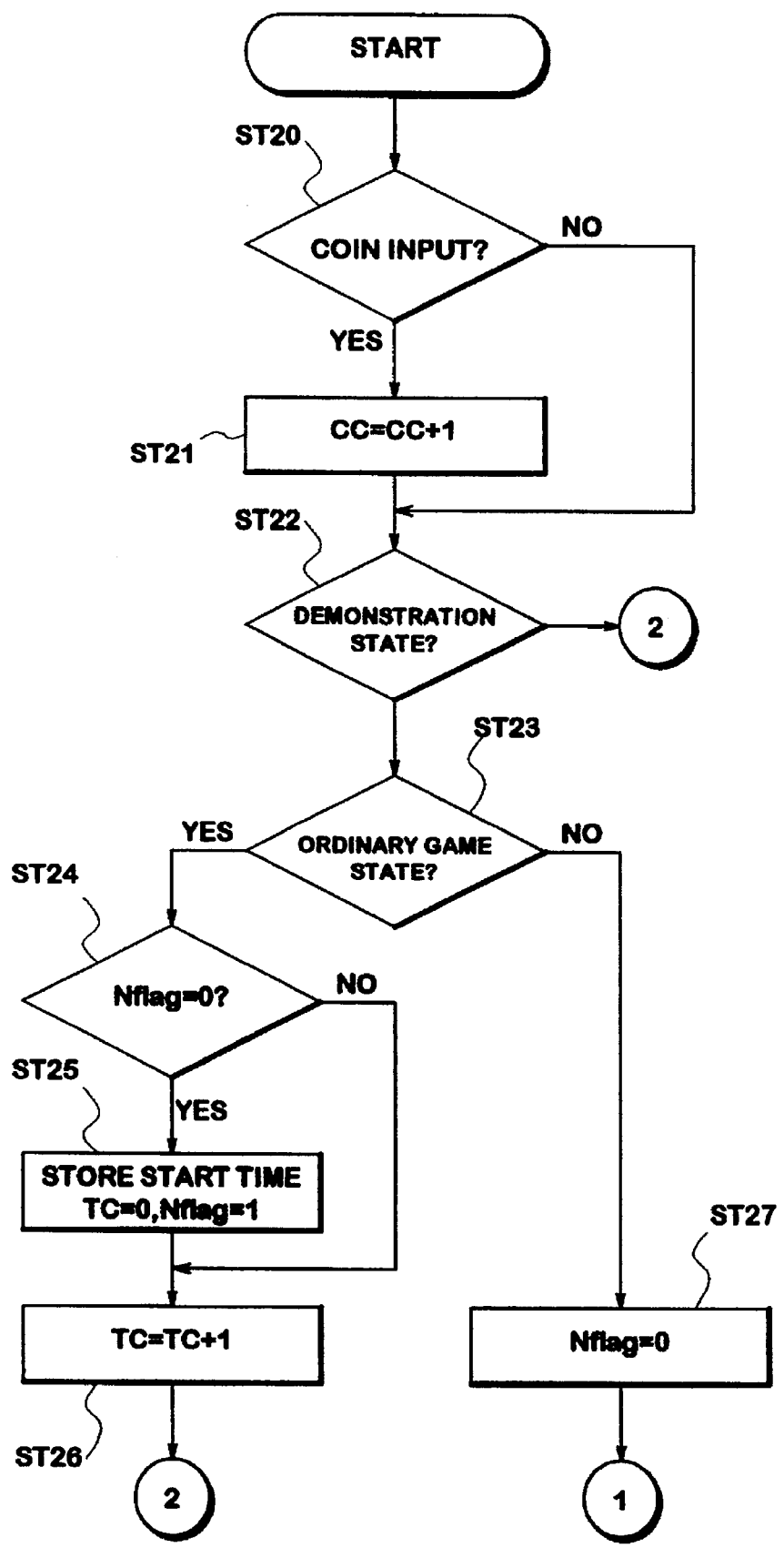
FIG. 7 is an interrupt process flow chart for knowing a game operation state.

In this embodiment, the steps ST25 and ST26 in FIG. 7 and the step ST43 in FIG. 8 correspond to part of the process run by the clock means 13 and the calculation means 11, and the steps ST22 and ST23 in FIG. 7 and the steps ST31, ST32, ST41, and ST42 in FIG. 8 correspond to part of the process run by the detecting means 9.

(6) Summed Results Display Process Flow Chart

Figure 9A:
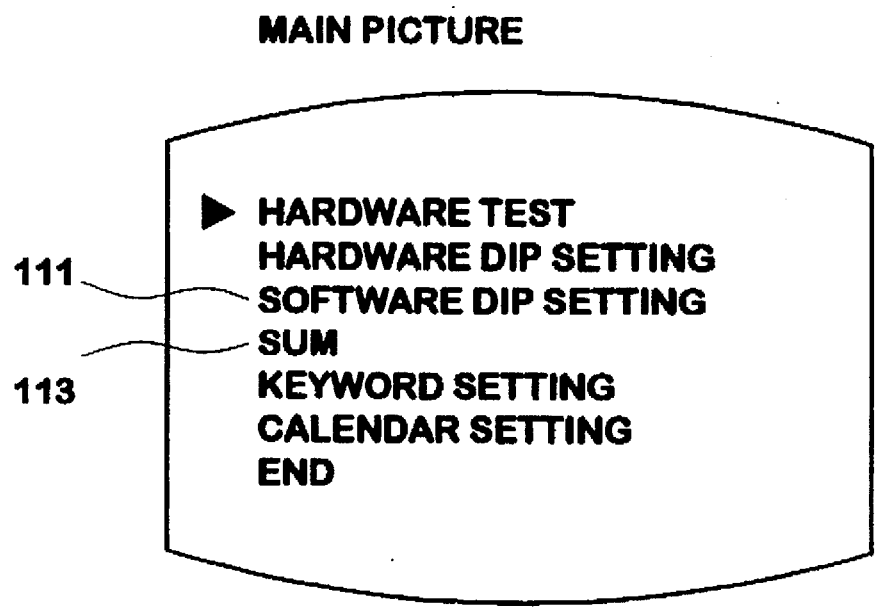
FIGS. 9A and 9B show displays of a CRT 73.

The process of summed results display will be described in reference to FIGS. 9 through 14. The main picture shown in FIG. 9 is displayed on the CRT 73 when the test switch (FIG. 3) is pressed.

In a "hardware test" mode, CRT color adjustment is made and various switches on the main unit are set. In a "hardware dip switch setting" mode, states of the dip switches on the circuit board are set. In a "software dip switch setting" mode, the number of coins in a game and difficulty level of each game program are set. Shift to the "software dip switch setting" mode is made by moving the cursor to the point 111 by operating the operation lever 67 and pressing the A button 66a. The display state on the CRT 73 when the process shifted to the "software dip switch setting" mode is shown in FIG. 9B.

Figure 9B:
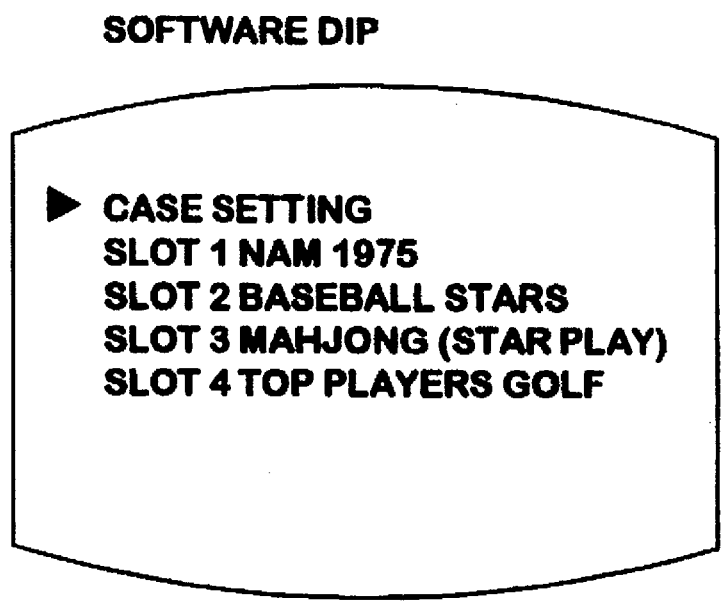

Of the "software dip switch setting" modes, the "case setting" mode shown in FIG. 9B is one for setting the number of coins (credits) in a game. In the "case setting" mode, names of the game programs set in the slots 1 through 4 are displayed. In that case, when there is a game program which was set in the slot before, the name of the game is also displayed. For example, it is known that a game "MAH-JONG" is currently set in the slot 3 where a game "STAR PLAY" was set before. In this way, the process can be simply returned to the previous program after seeing the display, since the previously set game is known, when a new game program is set but the game has not been played often.

Figure 10A:
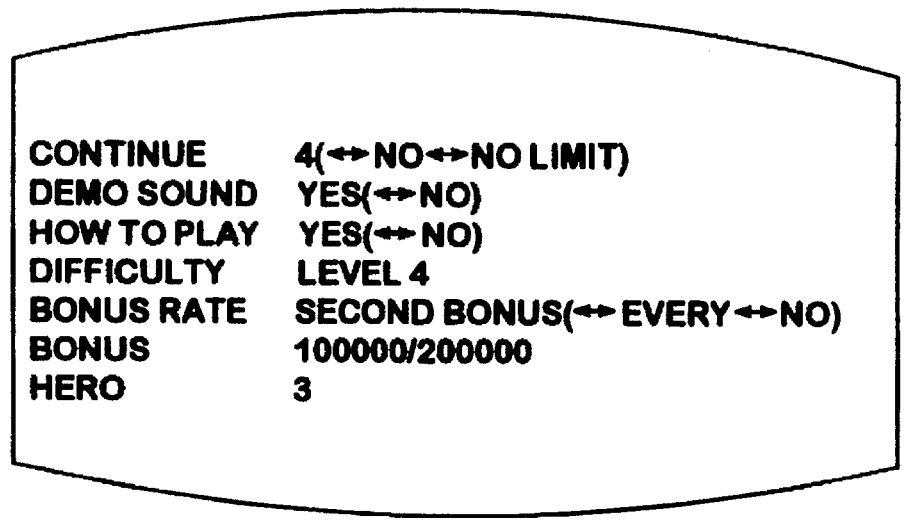
FIGS. 10A and 10B show displays of the CRT 73.

As shown in FIG. 10A, construction data for game structure of a game program to be set are displayed when the cursor is moved to the slot where the game program is set and the A button 66a is pressed. This process is performed by the CPU 53 reading the construction data from each game stored in the RAM 57.

The item "CONTINUE" in FIG. 10A refers to a limited number MAXCP (refer to step ST18 in FIG. 6) up to which resumptions are permitted. Since the MAXCP is 4 in this case, resumptions are permitted up to three times. The item "DEMO SOUND" in FIG. 10A sets whether sound is to be produced in the demonstration state. The item "DIFFICULTY LEVEL" indicates a degree of difficulty of a game. The items "BONUS RATE" and "BONUS" set a game bonus, and the item "BONUS RATE" indicates that the upper limit up to which the bonus point is given is two times. The item "BONUS" is the score point for which a bonus is given. With this game, when gained points reach 100,000, an additional weapon is given as a bonus, and when the gained points reach 300,000 by an increase of 200,000 from the first bonus time, another weapon is given as the second bonus. The item "HERO" refers to the number of weapons of a game user for example.

In this embodiment, construction data for eight games can be stored. When a new game is inserted in a game slot, initial data is transferred from the game cartridge and stored in the RAM 57. When data for eight games is already stored, the new construction data is written over the oldest construction data. An example of a construction data stored in the RAM 57 is shown in FIG. 11.

When the C button 66c is pressed after setting the construction data in FIG. 10, the display on the CRT 73 returns to the main picture.

The "sum display" mode will be described in reference to the flow chart shown in FIG. 12. In the menu picture shown in FIG. 9A, when the cursor is moved by the operation lever 67 to the point 113 and the A button 66a is pressed, a sum display picture is displayed on the CRT 73 as shown in FIG. 10B (step ST50 in FIG. 12).

The sum display includes the sum display for all the games and the sum display for each game program. There are two types of sum displays for the entire case; a "CASE/COIN" display form for displaying the number of coins and the number of service games, and a "CASE/PLAY" display form for displaying the number of plays, number of resumptions, and average time. The term "the number of coins" refers to the number of coins counted by the coin counter 59. The term "the number of service games" refers to the number of games which are stopped by machine trouble or the like and resumed by a game center staff member pressing a service button in the machine. The sum display for each game program includes display of the number of plays, number of resumptions, and average time. As described above, this device is capable of displaying any data which are deemed to be necessary for game machines.

Figure 10B:
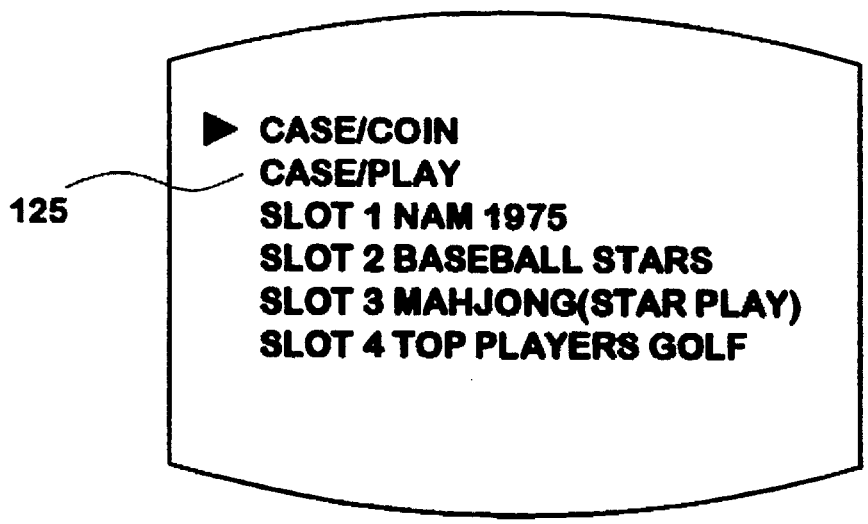
Figure 12:
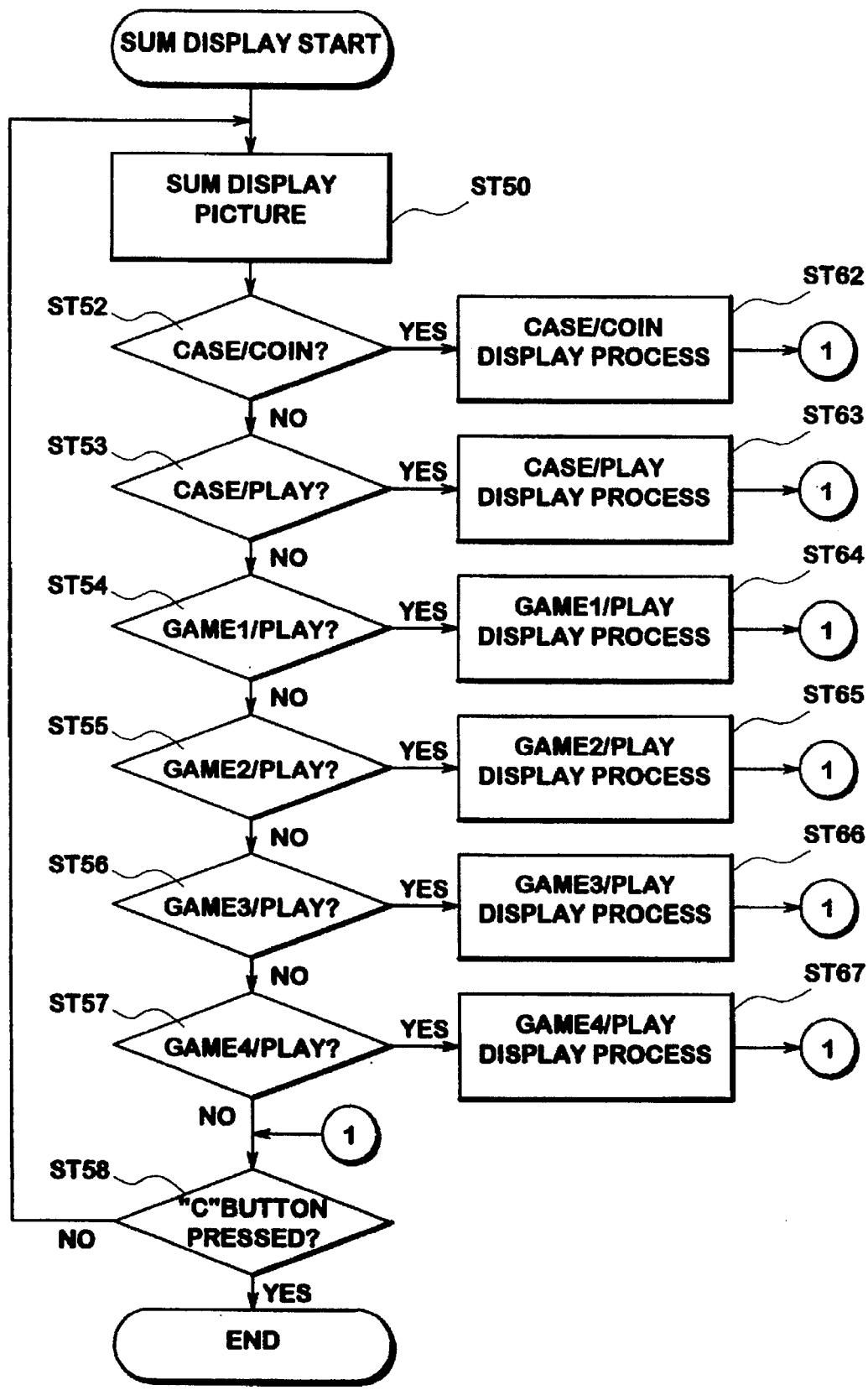
FIG. 12 is a flow chart for process sum display.

When the cursor is brought to the point 125 and the A button 66a is pressed, the sum display picture on the CRT 73 shown in FIG. 10B is changed to the "CASE/COIN" display mode (step ST62 in FIG. 12).

Figure 13:
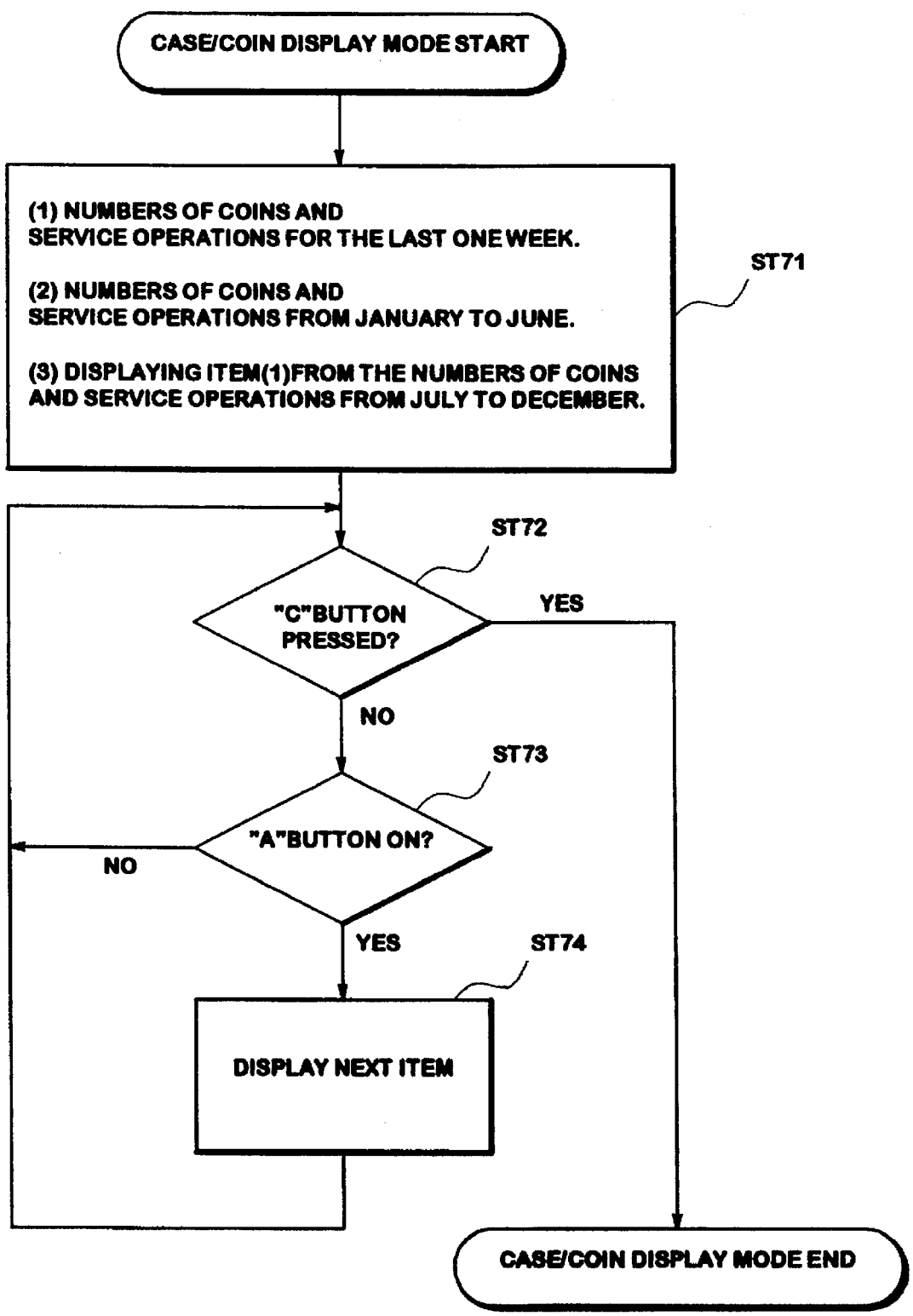
FIG. 13 is a flow chart for "CASE/COIN" display in the sum display process.

The "CASE/COIN" display mode will be described in reference to the flow chart shown in FIG. 13. First the CPU 53 displays on the CRT 73 the number of coins and the number of service games per day of the last one week as shown in FIG. 14A (step ST71 in FIG. 13). When the A button 66a is pressed, the CPU 53 displays the number of coins and the number of service games per month (of the first half of a year) as shown in FIG. 14B (step ST74 in FIG. 13). When the A button 66a is pressed again, the CPU 53 displays the number of coins and the number of service games per month (of the last half of a year) as shown in FIG. 14C. When the C button is pressed in the step ST72 in FIG. 13, the CPU 53 finishes the "CASE/COIN" display form, and displays a sum display picture on the CRT 73 as shown in FIG. 10B.

Figure 16:
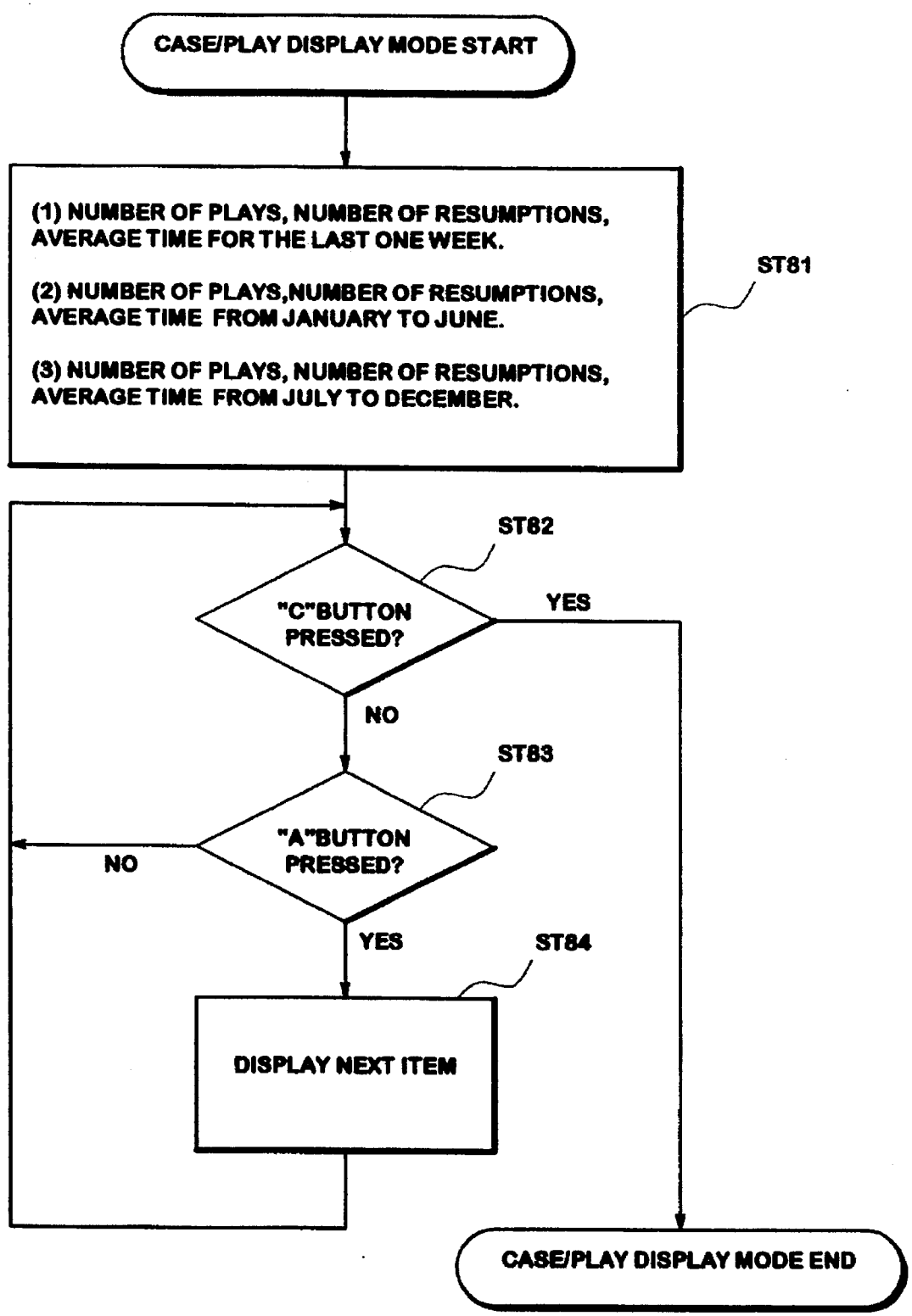
FIG. 16 is a flow chart in the "CASE/PLAY" display mode.

The "CASE/PLAY" display form will be described. In the "CASE/PLAY" display form, the CPU 53 displays the number of plays, number of resumptions, and average time for the entire case. In the "CASE/PLAY" display form too, similarly to the "CASE/COIN" display form, the CPU 53 displays the sum per day of the last one week (Refer to FIG. 15A)(step ST81 in FIG. 16), and then displays the sum per month of the first half year (Refer to FIG. 15B)(step ST84 in FIG. 16). When the A button 66a is pressed again, the CPU 53 displays the sum per month of the last half year (not shown). When the C button 66c is pressed under that state, the CPU 53 finishes the "CASE/PLAY" display process, and displays the sum as shown in FIG. 10B on the CRT 73.

The number of plays, number of resumptions, and average time are similarly displayed by selecting either one of the items "GAME 1/PLAY" through "GAME 4/PLAY." The CPU 53 also displays "GAME 1/PLAY" display per month of the first half year and "GAME 1/PLAY" display per month of the last half year when the A button 66a is pressed under the state of the "GAME 1/PLAY" per day being displayed.

When the C button 66c is pressed when the sum shown in FIG. 10B is displayed, the sum display process shown in FIG. 9 is finished (step ST31 in FIG. 9). Thus, the summed results stored in the RAM 57 are displayed on the CRT 73.

(7) Flow Chart for Changing Construction data for Game structure

This will be described in reference to FIG. 17. A change in the construction data, when required, is made according to the summed results obtained. First, the CPU 53 reads the construction data for the intended game program from the RAM 57 and displays them on the CRT 73 (step ST101 in FIG. 17). An operator, referring to the sum display, selects an item to be changed using the lever 67, and changes the construction data using the A button 66a (step ST103). For example, when the average time has increased, the operator can increase the difficulty level by the "software dip switch setting." This makes the construction data (such as the difficulty level and others) commensurate with the level of the player because the player's level is not determined by subjective data of the operator but by the average time as objective data. It may also be set that the game can be played for a longer period of time by changing the items "BONUS RATE" and "BONUS" without changing the difficulty level.

Figure 17:
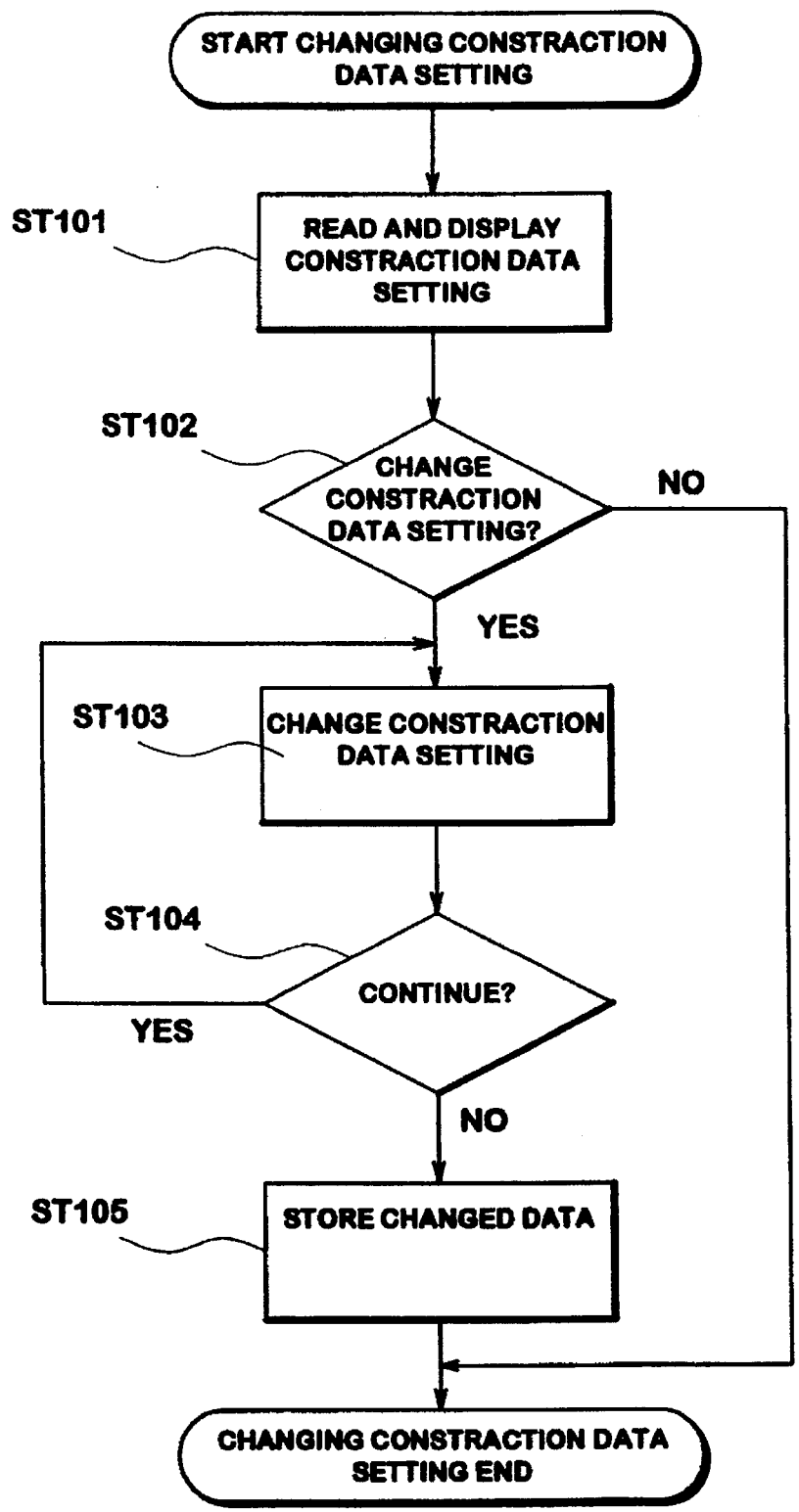
FIG. 17 is a flow chart in a "GAME ITEM SETTING" mode.

On the other hand, when changes are to be continued, the process of step ST103 in FIG. 17 is repeated. For example, when the "number of resumptions" has decreased, the game program may be changed to another game program. This makes it possible to determine the popularity of games based on the number of play resumptions as objective data and to correctly set games which are popular into the case.

When the D button 66d is pressed in the step ST104, the CPU 53 stores the changed construction data in the RAM 57 (step ST105) and this finishes the change in the construction data.

Figure 18:
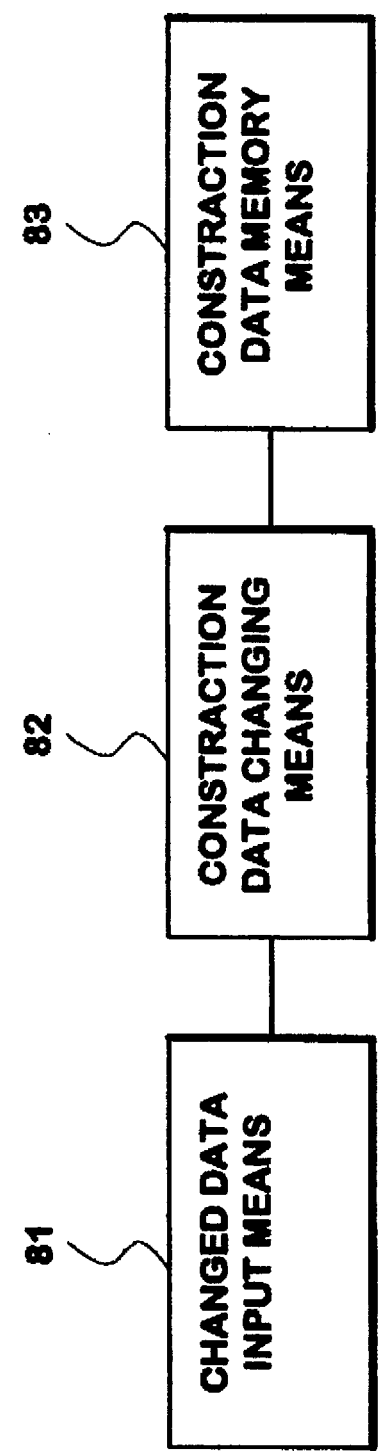
FIG. 18 is a functional block diagram of a construction data changing device according to this invention.

A functional block diagram of the above embodiment is shown in FIG. 18. In the embodiment described above, the RAM 57 constitutes a construction data memory means 83, the lever 67 and the A button 66a constitute changed data input means 81 for changing the construction data, and the CPU 53 constitutes a construction data changing means 82 for changing the construction data.

(8) Process of Storing in Memory Card

Figure 19:
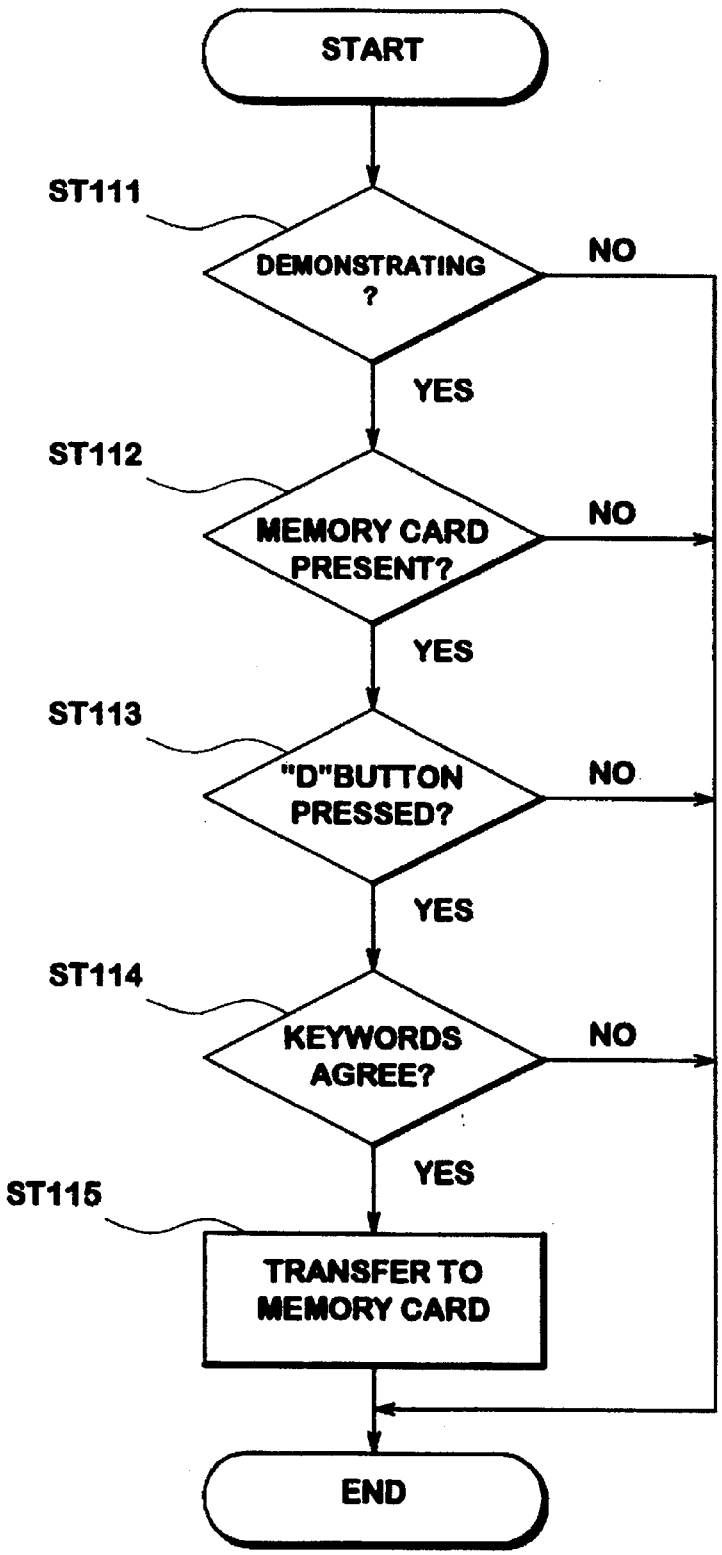
FIG. 19 is a process flow chart for storing data into a memory card.

This will be described in reference to FIG. 19. For the storing process, frequent opening operation of the case for reaching and operating switches inside the main unit would be troublesome. On the other hand, however, when memory card slots are simply provided outside the main unit, the summed results might be stolen by a third party. Therefore, this embodiment is arranged as described below to simplify the storing process while protecting the data.

An operator who wants to store the data inserts the memory card in the slot 63 and, during demonstration, presses the D button 66d. The CPU 53 reads a keyword preset in the memory card, and determines whether the keyword agrees with a keyword which has been stored previously in the main unit. The CPU 53 transfers the sum data to the memory card only if both keywords are in agreement (step ST115 in FIG. 19).

In other words, the CPU 53 starts the data transfer only if the conditions of the steps ST111 through ST114 are met. In this embodiment, a four digit number is used as the keyword.

The determination by keyword makes it possible to store the sum data easily in the memory card while protecting secret data, even when a large number of game machines are used. When the memory card slot 63 is provided on the front face of the main unit, the sum data can be easily stored in the memory card by simply inserting the memory card in the slot and inputting the keyword. If the keywords are not in agreement, the CPU 53 does not transfer the data as described above. Therefore, the sum data cannot be stolen by a third party who does not know the keyword.

Examples of the sum data transferred in the memory card as described above are shown in FIGS. 20A and 20B. FIG. 20A shows the data corresponding to FIG. 18A. FIG. 20B shows the data corresponding to FIGS. 18B and 17C. FIG. 21A shows the data corresponding to FIG. 19A. FIG. 21B shows the data corresponding to FIG. 19B.

(9) Setting Keyword

Figure 22:
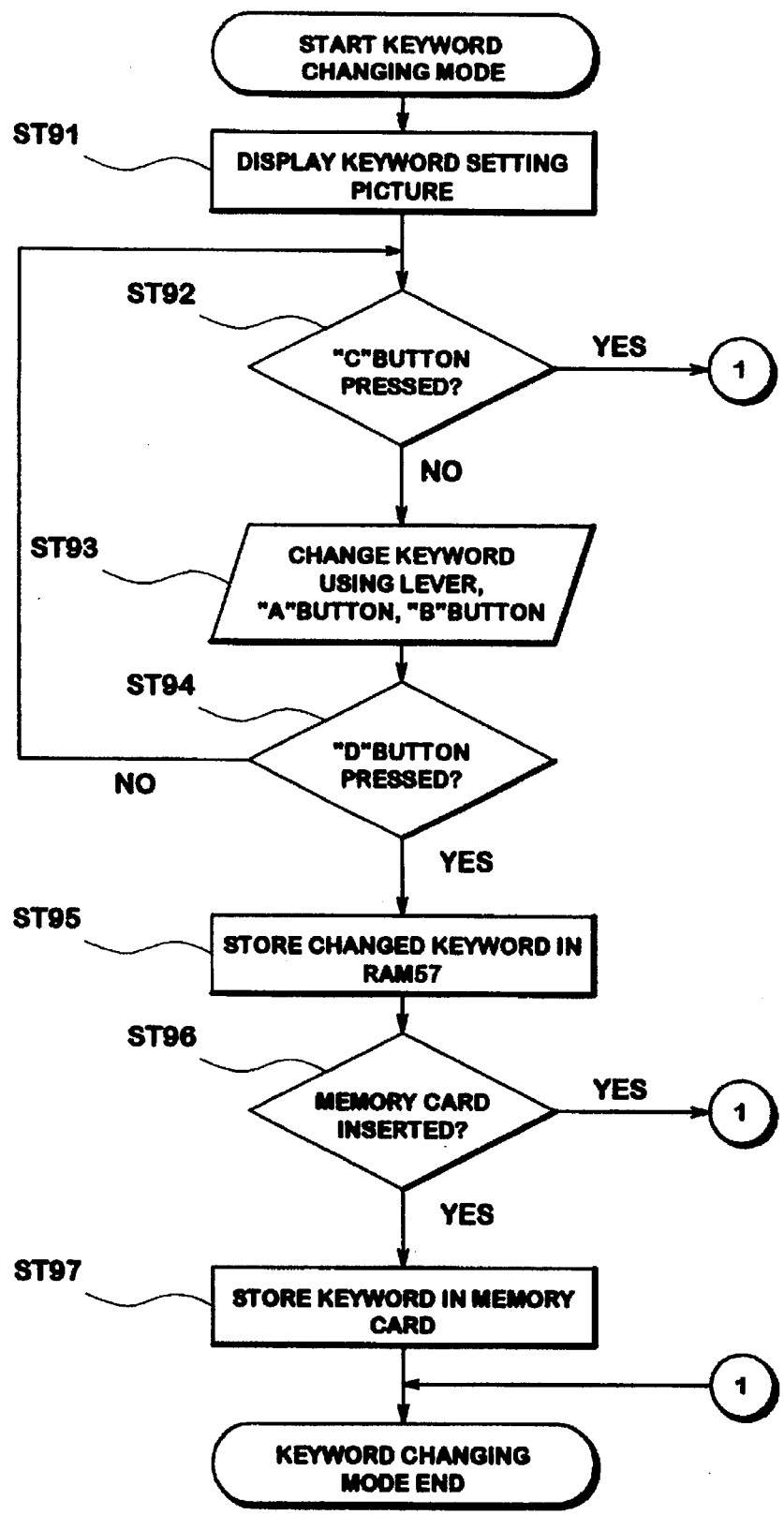
FIG. 22 is a flow chart in a "KEYWORD CHANGE" mode.

Setting keywords for the main unit and the memory card will be described in reference to FIG. 22. First, the setting of the keyword for the main unit will be described. The CPU 53 displays a keyword setting picture (step ST91 in FIG. 22), and a four-digit keyword is displayed on the CRT 73, when the operator selects a keyword setting picture from the main picture using the operation lever 67 and the A button 66a. The operator changes the keyword using the operation lever 67, A button 66a, and B button 66b (step ST93). For example, by moving the operation lever 67 in the right and left directions, the operator moves the cursor to one of the four numerals which the operator wants to change. This numeral is increased by pressing the A button 66a, and decreased by pressing the B button 66b. After finishing the keyword change, the operator presses the D button 66d. The changed keyword is stored in the RAM 57 (step ST95) when the D button 66d is pressed. This finishes the keyword setting for the main unit.

The keyword setting for the memory card will be described. The CPU 53 determines whether a memory card is inserted in the memory card slot (step ST96 in FIG. 22), and if yes, reads the keyword stored in the RAM 57 in the main unit and stores the read keyword in the memory card inserted (step ST97 in FIG. 22), and finishes the process. When no in the step ST96 in FIG. 22, the CPU determines not to perform storage of the keyword, and finishes the keyword setting process. When the C button 66c is pressed in the step ST92, the keyword changing mode is finished.

By the process of storage to the memory card, not only the game operation state data such as the number of plays, number of resumptions, average time, number of coins, and number of service games shown in FIGS. 14A and 15B, but also all the other data such as start time of each game, and game continuation time stored in the RAM 57 are transferred from the RAM 57 to the memory card. This provides game operation states every 24 hours, allowing to know the time of the day when the game is used most frequently.

Figure 23:
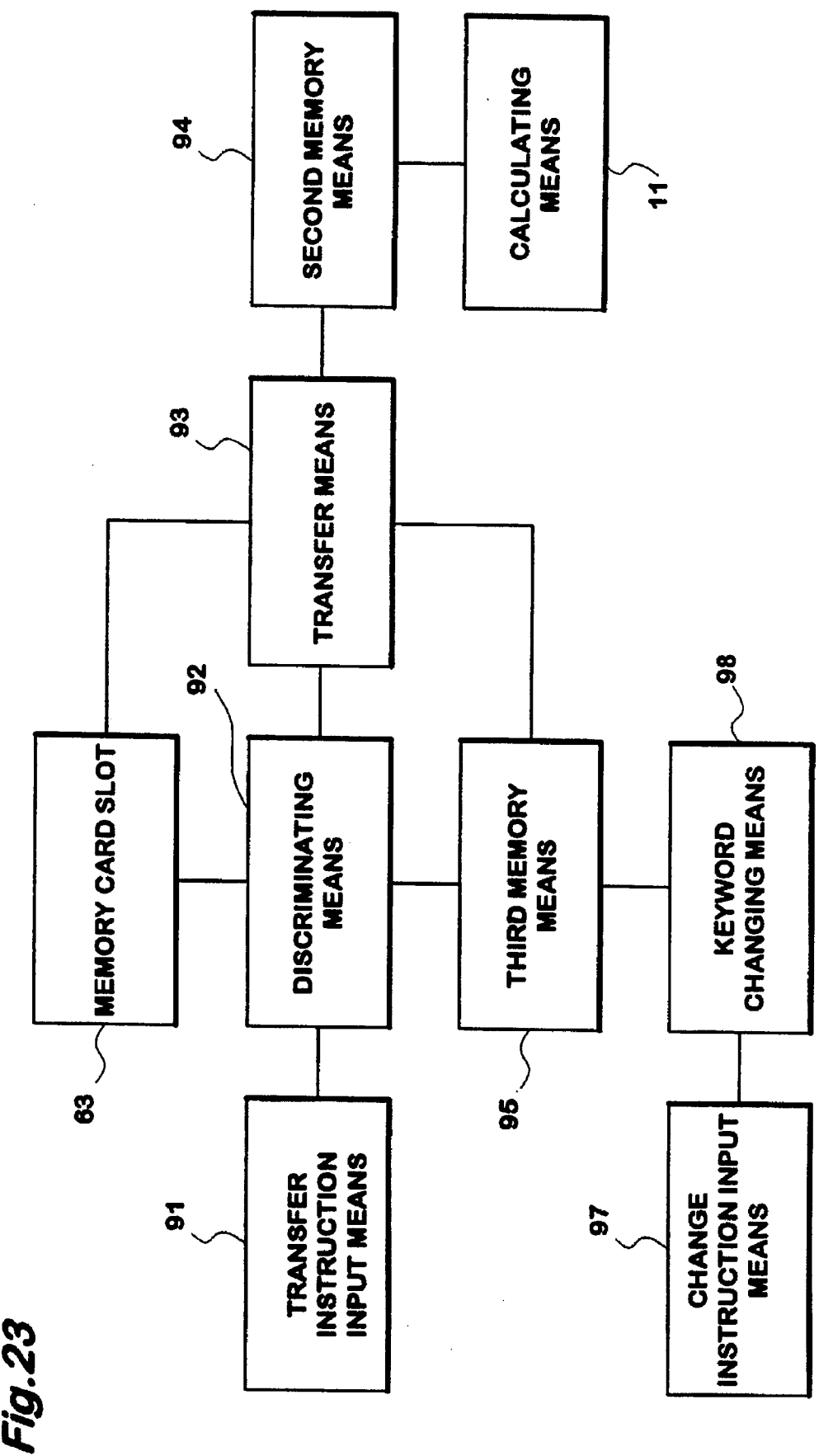
FIG. 23 is a functional block diagram of a sum data transfer device for the game operation state data control device according to this invention.

A functional block diagram of this embodiment is shown in FIG. 23. A sum data transfer device 100 shown in FIG. 23 comprises transfer instruction input means 91, keyword memory means 95, change instruction input means 97, keyword change means 98, determination means 92, transfer means 93, and sum data memory means 94.

The transfer instruction input means 91 receives transfer instructions. The keyword memory means 95 stores a keyword that has been set in advance. The change instruction input means 97 receives keyword change instructions. The keyword change means 98, upon receiving a keyword change instruction, changes the keyword stored in the keyword memory means 95. The sum data memory means 94 stores summed game operation state data given from the calculating means 11 (Refer to FIG. 1). Determination means 92, upon receiving a transfer instruction from the transfer instruction input means 91, determines whether the memory card is inserted in the memory card slot 63 (Refer to FIG. 2), and whether the keyword stored in the inserted memory card agrees with the keyword stored in the keyword memory means 95. The transfer means 93, based on the result of the determination means 92, transfers the sum data stored in the sum data memory means 94 to the memory card in the memory card slot 63.

In this embodiment, the CPU 53 constitutes the transfer means 93, determination means 92, and keyword change means 98; the operation lever 67, A button 66a, B button 66b, and D button 66d constitute the change instruction input means 97; and the RAM 57 constitutes the memory means 95.

(10) Calendar Setting Procedure

As described above, this device is so arranged that the game states at the time of an interruption are detected to obtain a game start time and others. Therefore, the interrupt time has to be in agreement with the current time. The calendar setting includes setting an internal clock to the current date and time. Since the procedure using the A button 66a, B button 66b, and operation lever 67 to select data and using the D button 66d to set is the same as that in setting the keyword, description of the calendar setting is omitted.

(11) Examples of Other Applications

While this embodiment is arranged to store the game start time and the game continuation time, it may also be so arranged that either of the two and the game end time are stored. In that case, the interrupt time when the game reaches a temporary end state may be stored in the RAM 57. It may also be arranged, when only the average time is required to determine a difficulty level, only the game continuation time is stored without storing the game start time.

While this embodiment is described on the game operation state data control device with four game programs inserted, this invention is not limited to that embodiment but may be applied to a game operation state data control device with less than four game programs inserted. In the case this invention is applied to a special game operation state data control device in which only one game program can be inserted, since the process for the system program and the game program is not repeated, the interrupt process at every 1/60 second is unnecessary when it is so arranged that a game state change signal is output only when the game state is changed in the game program.

While this embodiment is described on the game operation state data control device in which coins are thrown in, this invention may also be applied to similar devices in which bills or game tickets are inserted instead of coins.

While this embodiment is described so as to take out the summed results using the memory card, it may also be so arranged that the data is transferred through cable or wireless means. In that case, when it is arranged that the data is accumulated over a certain period of time and then transferred at a time, a communication line need not be constantly operative, and this is suited for the transfer using telephone lines.

When the transfer is made using cables or wireless means, it may also be done on a real time basis. This makes it possible to centrally control a plurality of game operation state data control devices with a central control device, for example, in a game center. When the sum data can be acquired on a real time basis as described above, the software dip switch setting described above can be easily changed according to situations.

In this embodiment, the functions shown in FIG. 1 are attained with the CPU 53 and the software. However, part or whole of the functions may be attained with hardware such as logic circuits.

The game operation state data control device or the game operation state data control method is capable of letting operators know the operation state of the game program. The game program is started at an insertion signal produced by the insertion of a valuable object for enabling said game to run and a game start signal produced by the operation of a player. Then calculation of the game program start time and game program end time is made from the detected current time and the detected current game state data of the game program. Or, calculation of the game continuation time of the game program is made from the detected current time and detected current game state data of the game program. Therefore, the game program start time and end time of the game program, or the game continuation time of the game program are obtained.

Operators can know an average game time as the game operation state. The calculation means further calculates the average game time of the game program based on the game start and game end times, or the average game time of the game program based on the game continuation time. Therefore, average game time for each game program is obtained.

Operators can know the number of game resumptions as an operation state of a game program. The game program control means, upon receiving a resume signal, restarts the game program at a speed commensurate with the degree of progress at the time of temporary end, and at the same time produces a resume start signal. The calculation means calculates and outputs the number of resume start signals. Therefore, the number of resume start signals is obtained for the cases in which resume starts are made from the temporary end state.

Operators can know the game operation state accurately even when there are a plurality of game programs. In the game operation state data control device of this invention, the game program control means, based on the selection signal described before, starts the corresponding game program. The calculation means calculates the start time and the end time of each game program based on the time data and the game state data, or calculates the game continuation time of the game program based on the time data and the game state data. Therefore, the start time and the end time of the game program, or the game continuation time for each game program is obtained even when there are a plurality of game programs.

Operators can know the operation state of each game program with a simple structure. In the game operation state data control device of this invention, the game programs are stored in the game cartridges. The game state detection means is provided in the main unit where the game cartridges are inserted. The game state detection means performs interrupt processes to the game program at specified time intervals to detect the current game state of the corresponding game program. Therefore, the game state is known for each game program when there are a plurality of game cartridges without providing individual game state detection means to each game cartridge.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A game operation state data control device for a game machine comprising:

a sensor for outputting a throw-in signal when a valuable object is thrown in said game machine, a button for outputting a game start signal when operated by a player, a first generating means for generating a game start enabling signal upon receiving said throw-in signal and said game start signal, a control means for starting a game program upon receiving said game start signal, a detecting means for detecting current game state data, a clock means for generating time data designating current time, a calculating means for calculating game operation state data according to said time data and said current game state data, and a game operation state data storing means for storing said game operation state data not so as to decide whether said player can play said game machine but to analyze running state data of said game machine.

2. A game operation data control device of claim 1, wherein said game operation data are start time and end time of said game program.

3. A game operation data control device of claim 2, wherein said game operation data further include an average game time of said game program obtained from said start time and said end time.

4. A game operation data control device of claim 1, wherein said game operation data is a game continuation time of said game program.

5. A game operation data control device of claim 4, wherein said game operation data further include an average game time of said game program obtained from said game continuation time of said game program.

6. A game operation state data control device for a game comprising:

a sensor for outputting a throw-in signal when a valuable object is thrown in said game machine, a button for outputting a game start signal when operated by a player, a first generating means for generating a game start enabling signal upon receiving said throw-in signal and said game start signal, a control means for starting a game program upon receiving said game start signal, a detecting means for detecting current game state data, clock means for generating time data designating current time, means for calculating game operation state data according to said time data and said current game state data, a first memory means for storing game progress degree at a temporary end time of said game program as a temporary end time progress degree, and a second generating means for generating a resume signal upon being operated by a player, said control means starting said game program upon receiving said resume signal at a progress degree corresponding to said progress degree at said temporary end time, and generating a resume signal, and said calculating means calculating a number of resumptions by counting said resume signals.

7. A game operation data control device of claim 6, wherein;

said game start signal outputted from said game start selection button includes a selection signal for determining a game program to be selected from a plurality of game programs, said game program control means starts a corresponding game program according to said selection signal, and said calculating means calculates said game operation data for each game program.

8. A game operation data control device of claim 7, further comprising game cartridges for storing said game programs, and a main unit into which said cartridges are inserted, wherein;

said detecting means being provided in said main unit and performing interrupt process to said game program at predetermined time intervals to detect current game state of corresponding game program.

9. A game operation data control device of claim 6, further comprising;

a second memory means for storing said game operation data calculated with said calculating means, and means for transferring to external memory means said game operation data stored in said second memory means upon receiving a transfer discrimination instruction.

10. A game operation data control device of claim 9, further comprising;

a third memory means for storing a predetermined keyword, a first input means for inputting a transfer instruction, and means for determining upon receiving said transfer instruction from said first input means, whether a keyword stored in said external memory means is in agreement with a keyword stored in said third memory means, and when in agreement, for outputting said transfer determining instruction to said transfer means.

11. A game operation data control device of claim 10, further comprising;

memory card slot as said external memory means, said determining means determining said keyword agreement when said memory card is inserted in said memory card slot.

12. A game operation data control device of claim 10, further comprising;

a second input means for inputting a keyword change instruction, and keyword changing means for changing said keyword stored in said third memory means upon receiving a keyword change instruction from said change instruction input means.

13. A game operation state data control device for a game machine comprising:

a sensor for outputting a throw-in signal when a valuable object is thrown in the game machine;

a button for outputting a game start signal when operated by a player;

a first generating means for generating a game start enabling signal upon receiving said throw-in signal and said game start signal;

a second generating means for generating a resumption signal upon being operated by said player;

a control means for starting a game program upon receiving said game start enabling signal or resuming said game program upon receiving said resumption signal;

a detecting means for accessing said control means to detect current game state data;

a clock means for generating time data; and a calculation means for calculating game operation state data according to said time data, said current game state data and at least one of said game start enabling signal and said resumption signal.

14. A game operation state data control device for a game machine according to claim 13, further comprising a display means for displaying said game operation state data calculated by said calculation means.

15. A game operation state data control device for a game machine according to claim 13, further comprising:

a display means for displaying construction data for said game program; and an update means for updating said construction data based on said game operation state data.

* * * * *